A. E. GAULT.
STROKE REGULATOR FOR WINDMILL PUMPS.
APPLICATION FILED OCT. 21, 1914.

1,138,550.

Patented May 4, 1915.
2 SHEETS—SHEET 1.

Inventor
Alva E. Gault,
By Victor J. Evans
Attorney

Witnesses

A. E. GAULT.
STROKE REGULATOR FOR WINDMILL PUMPS.
APPLICATION FILED OCT. 21, 1914.

1,138,550.

Patented May 4, 1915.
2 SHEETS—SHEET 2.

Witnesses

Inventor
Alva E. Gault,
By Victor J. Evans
Attorney

UNITED STATES PATENT OFFICE.

ALVA E. GAULT, OF EUSTIS, NEBRASKA.

STROKE-REGULATOR FOR WINDMILL-PUMPS.

1,138,550.  Specification of Letters Patent.  Patented May 4, 1915.

Application filed October 21, 1914. Serial No. 867,832.

*To all whom it may concern:*

Be it known that I, ALVA E. GAULT, a citizen of the United States, residing at Eustis, in the county of Frontier and State of Nebraska, have invented new and useful Improvements in Stroke-Regulators for Windmill-Pumps, of which the following is a specification.

This invention is an improved stroke regulating apparatus especially adapted for use in connection with a windmill and with a pump operated by the windmill to more fully utilize the down stroke of the wheel rod and cause as much water to be lifted by the pump by the down stroke as by the up stroke of the wheel rod; to also increase the length of the stroke of the pump rod, to balance the power of the down and up strokes, and to also prevent the windmill from pounding and its shaft from wearing out the boxings or bearings in which it is mounted.

Another object of the invention is to provide an improved stroke regulating apparatus which greatly increases the effective power of a windmill and enables the same to operate a pump in a light wind that would otherwise not suffice to turn the wind wheel.

With the above and other objects in view the invention consists in the construction, combination and arrangement of devices hereinafter described and claimed.

Figure 1:
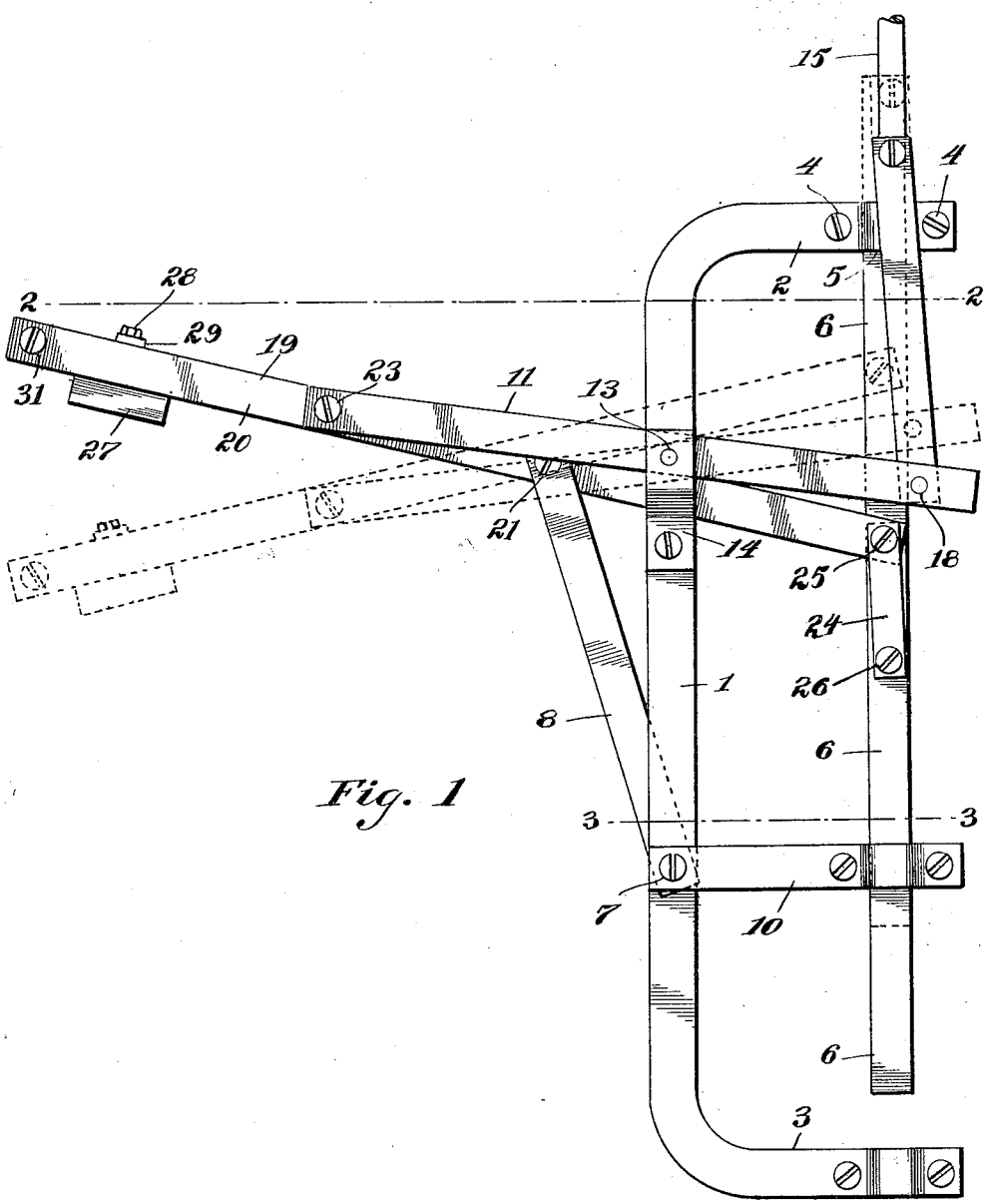
Figure 2:
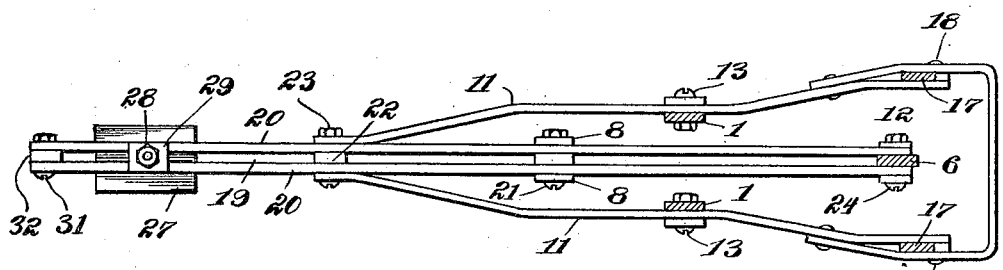
Figure 3:
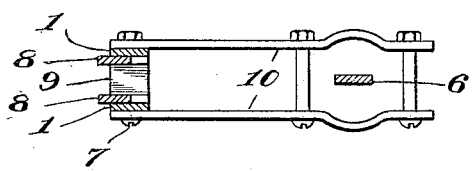

In the accompanying drawings:—Figure 1 is a side elevation of a stroke regulating apparatus constructed in accordance with my invention, and showing the same connected to the wheel rod of a windmill and also to the operating rod of a pump, the pump and wheel levers being shown in down stroke position in full lines and in up stroke position in dotted lines. Fig. 2 is a horizontal sectional view of the same on the plane indicated by the line 2—2 of Fig. 1. Fig. 3 is a similar view on the plane indicated by the line 3—3 of Fig. 1.

In accordance with my invention I provide a frame which is here shown as comprising a pair of vertical bars 1 which have their upper ends bent at a right angle to form arms 2 and their lower ends similarly bent to form arms 3. The arms 2 are bolted together at points near their outer ends as at 4 and the parts thereof between said bolts are offset in opposite directions to form a slide bearing 5 for the vertically movable pump rod 6. The bars 1 are connected together at a point a suitable distance from their lower ends by a bolt 7. Said bars are arranged in spaced relation. A pair of shiftable fulcrum arms 8 have their lower ends pivotally mounted on said bolt, between the bars 1, and a spacer block 9 is arranged on said pivot bolt and between the lower ends of said shiftable fulcrum arms. The bolt 7 also secures a pair of horizontally arranged clamping arms 10 to the bars 1. A wheel lever 11 is also provided which is here shown as substantially U-shaped in plan, broadened at one end, so as to clear the pump rod, as at 12. The arms of the pump lever are fulcrumed by pivots 13 and clips 14 on the outer sides of the bars 1, at a point a suitable distance from the upper end of the frame. The windmill rod is indicated at 15. Its lower end is bolted between the upper ends of a pair of links 17, the lower ends of said links being pivotally connected to the sides of the broadened end of the wheel lever as at 18.

The pump lever, which operates the rod 6, is shown at 19 and comprises a pair of straight arms or members 20 which are slightly spaced apart. The members of the pump lever are pivotally connected as at 21 to the upper ends of the shiftable fulcrum arms 8, a spacer 22 being arranged between said members. Said members are also pivotally connected to the wheel lever to enable the pump lever to be operated by the wheel lever, the said pivotal connection being here shown as a bolt 23 which passes through coincident openings near the outer ends of the arms of the wheel lever and in the members of the pump lever at a point a suitable distance from the fulcrum 21 of said pump lever. The load end of the pump lever is connected to the pump rod by a pair of links 24 which have their upper ends pivotally connected to the members of the pump lever by bolts 25 and their lower ends pivotally connected to the bolt rod by a bolt 26. The pump rod passes through the space between the members of the pump lever and the said links 24 are arranged on opposite sides of the pump rod as shown. The power end of the pump lever extends a considerable distance from the pivot 23 and a weight 27 is carried by the pump lever, the said weight being here shown as adjustably mounted on the pump lever by a bolt 28 which passes up through the space between the members or arms of the pump lever and has a clip or washer 29 which bears on said arms. By first loosening the nut 30 of said bolt the weight may be shifted toward or from the power end of the pump lever and the weight may be secured in adjusted position by then tightening the nut. A bolt 31 is here shown as connecting the extreme outer or power ends of the members of the pump lever, a spacer 32 being interposed between them.

In the operation of my improved stroke regulator, the wheel lever 11 which operates the pump lever causes the latter to impart a longer stroke to the pump rod 6 than the stroke of the wheel rod. The down stroke of the lever causes the weight to be lifted and the weight, having been adjusted to correspond to the height of the column of water to be lifted serves to balance the power of the wheel revolution making the power on the down stroke the same as on the up stroke. This also prevents the wheel from pounding and wearing out the bearings of its shaft. Moreover owing to the increase in the stroke of the pump rod a greater quantity of water is lifted by the pump without any additional expenditure of power by the windmill or pump. The length of the stroke can be changed by shifting the fulcrum of the pump lever. The stroke regulating apparatus also relieves the pump rod of vibration and increases the life of the pump cylinder. When the device is disconnected from the windmill it makes a perfectly balanced hand pump.

While I have herein shown and described a preferred form of my invention I would have it understood that changes may be made in the form, proportion and construction of the several parts without departing from the spirit of the invention and within the scope of the appended claims.

Having thus described my invention, I claim:—

1. In a stroke regulating apparatus of the class described, the combination of a frame, a lever fulcrumed thereto, a reciprocating element connected to said lever, a second lever connected to the first named lever for operation thereby, a second reciprocating element connected to the second lever, a shiftable fulcrum for the second lever, and a weight on the second lever to counteract the force of the down stroke of the first named lever.

2. In a stroke regulating apparatus of the class described, the combination of a frame, a lever fulcrumed thereto, a reciprocating element connected to said lever, a second lever connected to the first named lever for operation thereby, a second reciprocating element connected to the second lever, a shiftable fulcrum for the second lever, and a weight carried by and shiftable on the second lever to counteract the force of the down stroke of the first named lever.

In testimony whereof I affix my signature in presence of two witnesses.

ALVA E. GAULT.

Witnesses:
N. S. SAGE,
PETER RASMUSSEN.